United States Patent [19]
Plewa

[11] 3,950,821
[45] Apr. 20, 1976

[54] SAUSAGE STUFFING DEVICE
[75] Inventor: Manfred Plewa, Verden, Germany
[73] Assignee: VEMAG Verdener Maschinen und Apparatebau GmbH, Verden, Germany
[22] Filed: Aug. 26, 1974
[21] Appl. No.: 500,464

[30] Foreign Application Priority Data
Aug. 27, 1973 Germany............................ 2343103

[52] U.S. Cl. ............................................... 17/41
[51] Int. Cl.² ............................................. A22C 11/02
[58] Field of Search............ 17/41, 33, 34, 35, 1 F, 17/49

[56] References Cited
UNITED STATES PATENTS
| | | | |
|---|---|---|---|
| 3,274,005 | 9/1966 | Alsys.................................... | 17/35 |
| 3,317,950 | 5/1967 | Ziolko................................... | 17/41 |
| 3,383,222 | 5/1968 | Alsys et al. ............................ | 17/49 |
| 3,570,045 | 3/1971 | Matecki................................. | 17/42 |
| 3,751,764 | 8/1973 | Dobbert................................. | 17/41 |

Primary Examiner—Russell R. Kinsey
Assistant Examiner—James D. Hamilton
Attorney, Agent, or Firm—Olson, Trexler, Wolters, Bushnell & Fosse, Ltd.

[57] ABSTRACT

A tube-like socket is provided in a machine for stuffing sausage and the like. A nozzle is swingably or pivotally mounted for swinging movement between operating position in which a sausage tubing feeds between the socket and nozzle, and idle position away from the socket. A hook-like structure is pivotally converted to the mounting mechanism for the nozzle such that it projects through the nozzle with the nozzle in idle position and automatically feeds sausage tubing through the nozzle as the nozzle is swung to operating position.

7 Claims, 1 Drawing Figure

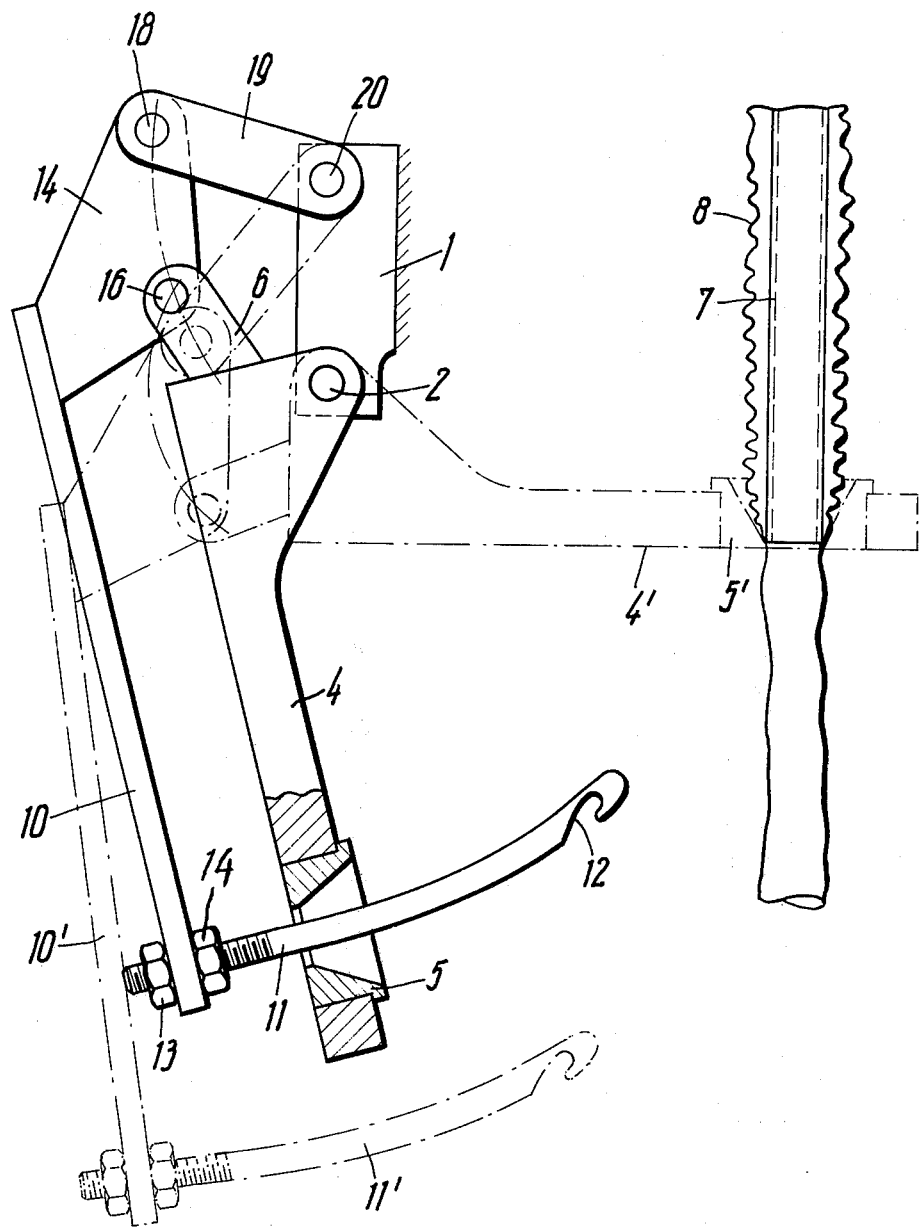

SAUSAGE STUFFING DEVICE

DESCRIPTION OF THE INVENTION

The invention relates to a device for the stuffing of plastic materials, for instance sausage "brät" into a casing or the like which is slid on a tube-like socket and, during the stuffing operation, runs off through an annular opening between the mouthpiece of the socket and a nozzle which is movable back and forth between a filling position and an idle position.

If the supply of casing, which had been slid on the socket, for instance a pivotally mounted socket, has been used up, the socket must be removed and a new supply of casing ribbon must be slid on the socket. Since the capacity of a modern stuffing device of the present type depends to a large degree on how fast the socket can be restocked with a new supply of casing, this operation is of special importance.

There are sturdy qualities of casings where the beginning of the casing ribbon is wrapped once around the exit of the socket tube. Then the nozzle is placed in the stuffing position, and finally the casing is pressed through the nozzle in the direction of the operation with the help of the filling pressure.

Unfortunately, many natural and synthetic casings cannot withstand the increased mechanical stress which occurs with this operation when the filling pressure is used; therefore the casing very frequently bursts. In order to avoid this, the person operating the machine must thread the beginning of the casing through the nozzle with his fingers. This action is tedious and time consuming.

The invention is therefore based on the problem to design a device of the present type in such a way that, at the beginning of the filling operation, the start of the casing can be easily threaded through the nozzle (which has been moved into its filling position) without any damage.

As set forth in the present specification, this problem is solved by a hook at the end of a pin which is coupled with the device by way of connecting elements in such a manner that it reaches through the nozzle when the nozzle is in the idle position and threads the end of the casing, which has been fastened on the hook, through the nozzle opening when the nozzle returns to its filling position.

With a device designed in such a way no special operation is necessary to thread the casing through the nozzle. The operator must merely turn the front end of the casing supply, which has been slid on the socket, into the opposite hook and then pivot the nozzle into its filling position. The threading of the casing through the nozzle then takes an automatic course.

According to the construction type of the filling device the pin, on whose end the hook is located, can be disposed either stationarily or movably on the device. On a device with a pivotable carrier for the nozzle, the nozzle plane of which is at a distance from the axis of rotation of the carrier, the connecting elements of the pin consist preferably of a carrying arm and a rectangular linkage attached on said arm where the one link pivot lies on the axis of rotation of the nozzle carrier. In this connection it can be of advantage if the pin has a curvature.

This way there is achieved with relatively simple kinematic means that the hook always moves through the center of the nozzle. This solution has the additional advantage that, with appropriate dimensioning of the rectangular linkage, the hook in its idle position is near the mouthpiece of the turn-off socket and, in its filling position, is at a sufficiently far distance from said mouthpiece. This way, on the one hand, one can thread conveniently and, on the other hand, one can maintain a sufficient distance from the threading hook and the exiting stuffed casing during the filling operation.

It can be of advantage to design the hook in the type of the eye of a needle that is open at the side.

The pin can also be screwed on the carrying arm so that, according to the quality of the casing, the best suited pins with corresponding hooks can be inserted and used.

In the following, a preferred embodiment of the invention is explained in detail with reference to the drawing. In the only FIGURE of this drawing the nozzle of a filling device for casings and such, which is fastened on a pivotable carrier, is shown in section by continuous lines in its threading position and by dash-dotted lines in its filling position.

A filling device (which is not shown in the drawing) includes a stationary attachment 1 with a point of rotation 2 in the form of a bolt for a rotatable holding arm 4 with a nozzle 5 for a holding device for the casing as it is used, for instance, for sausage stuffing machines. This nozzle carrier 4 can be rotated around an axis formed by the point of rotation 2 from the lower idle position, which is shown by continuous lines in the drawing and in which the front end of the casing 8 can be fastened on a threading pin 11 (which will be described in detail hereinafter), into a filling position indicated by dash-dotted lines.

In the filling position, the holding arm is indicated by 4' and the nozzle by 5'. In this position the mouthpiece of a pivotable socket 7 of the holding device for the casing is indicated by dots and dashes is in a conical enlargement of the nozzle 5 while forming an annular opening through which the casing 8 can pass braked during the filling position.

As can be seen in the drawing, the narrowest area of the bore in the nozzle 5 is in a plane which runs approximately in the area of the lower edge of the holding arm 4 and is distant from the point of rotation 2. In order that the threading pin 11, which protrudes through the bore of the nozzle 5 in the idle position or threading position of the nozzle, moves always through the center of the nozzle bore, it is necessary in the present example that the threading pin 11 has a curvature. beyond this, the threading pin 11 is kinematically connected with the holding arm 4 by way of a rectangular linkage which is described in detail immediately hereinafter.

As can be learned from the drawing, the threading pin 11 carries on its rear end a thread and is screwed in place in a corresponding bore on the free end of a hook carrier by means of two nuts 13 and 14. This screw connection permits the alternative fastening of a corresponding threading pin 11 with an appropriately shaped hook 12 on the hook carrier 10 according to the type of casing used.

The actual rectangular linkage for the kinematically correct coupling of the hook carrier 10 to the holding arm 4 of the holding device for the casing is formed by the previously mentioned stationary attachment 1 on the device, an attachment 6 of the holding arm 4, a base attachment 14 and, on the upper end of the hook carrier 10 in the drawing, a tongue 19 and also a total of 4 points of rotation 2, 16, 18 and 20. As mentioned before, the point of rotation 2 connects the stationary attachment 1 with the holding arm 4. In the point of rotation 16, the base attachment 14 is pivotally connected with the attachment 6 of the holding arm 4, whereas the tongue 19 is connected at points of rotation 18 and 20 with the base attachment 14 or the stationary attachment 1, respectively.

In the idle position or threading position illustrated by continuous lines in the drawing, the holding arm 4 with the nozzle 5 is swung away from the mouthpiece of the pivotable socket 7 drawn by dots and dashes. In this position a new casing 8 can be slid on the socket 7 and the lower free end of the casing 8 can be hung into the hook 12 of the threading pin 14 which protrudes through the nozzle 5.

When subsequently the holding arm with the nozzle 5 is again swung into the filling position indicated by dots and dashes, the threading of the casing 8 through the opening of the nozzle 5 takes place automatically. The rectangular linkage described before assures that the threading pin 11 always moves through the center of the nozzle bore 4. When the holding arm 4 is in its filling position designated by 4', the hook carrier 10 with the threading pin 11 assumes a second position which is also drawn dash-dotted, and in which the hook carrier is marked 10' and the threading pin 11'.

The specific example of the invention as heretofore described is by way of illustrative example. Various changes will no doubt occur to those skilled in the art and will be understood as forming a part of the present invention insofar as they fall within the spirit and scope of the appended claims.

The invention is claimed as follows:

1. Apparatus for stuffing plastic material into a casing or the like comprising a tube-like socket over which said casing is fed, a nozzle, means pivotally mounting said nozzle for movement about a first pivot between filling position and idle position, said nozzle in filling position being substantially coaxial with said socket and providing an annular opening between said socket and said nozzle and through which said casing is fed, said nozzle in idle position being remote from said socket, a threading device, means pivotally mounting said threading device for pivoting about a second pivot, and linkage means interconnecting said nozzle mounting means, said second pivot and said threading device whereby said threading device extends through said nozzle in idle position and automatically retracts therefrom during pivoting of said nozzle to filling position to thread a casing through said nozzle, said second pivot shifting laterally of itself during said pivoting of said nozzle, said threading device being farther from said socket with said nozzle in filling position than with said nozzle in idle position.

2. Apparatus as set forth in claim 1 wherein said threading device comprises a pin having a hook adjacent but spaced from the end thereof.

3. Apparatus as set forth in claim 2 wherein said pin is curved.

4. Apparatus as set forth in claim 2 wherein the hook resembles the eye of a needle open at one side.

5. Apparatus as set forth in claim 1 wherein the threading device comprises an elongated member which is screw-connected with a pivoted carrying arm.

6. Apparatus as set forth in claim 1 said linkage is four-sided, one side comprising a fixed base on which the nozzle mounting means is pivoted.

7. Apparatus as set forth in claim 6 wherein the pivotal mounting means for said threading device comprises a third side pivotally connected to said nozzle mounting means as a second side, the fourth side comprising a link pivoted to said base and to said threading device pivotal mounting means.

* * * * *